United States Patent
Stamires et al.

(10) Patent No.: US 6,652,828 B2
(45) Date of Patent: Nov. 25, 2003

(54) PROCESS FOR PRODUCING MG-CONTAINING NON-AL ANIONIC CLAY

(75) Inventors: Dennis Stamires, Newport Beach, CA (US); William Jones, Cambridge (GB)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/231,673

(22) Filed: Aug. 30, 2002

(65) Prior Publication Data

US 2003/0049189 A1 Mar. 13, 2003

Related U.S. Application Data

(63) Continuation-in-part of application No. 09/637,243, filed on Aug. 11, 2000, now Pat. No. 6,444,188.
(60) Provisional application No. 60/148,245, filed on Aug. 11, 1999.

(51) Int. Cl.$^7$ ............... C01F 5/02; C01F 5/14; C01F 5/24; C04B 33/04; B01J 21/16
(52) U.S. Cl. .......... 423/593; 423/594; 423/599; 423/420.2; 252/315.5; 501/141; 502/80
(58) Field of Search ............. 252/315.5; 106/632; 502/80; 501/141; 423/593, 594, 599, 420.2

(56) References Cited

U.S. PATENT DOCUMENTS

| | | | |
|---|---|---|---|
| 3,796,792 A | 3/1974 | Miyata et al. | 423/250 |
| 3,879,523 A | 4/1975 | Miyata et al. | 423/250 |
| 3,879,525 A | 4/1975 | Miyata et al. | 423/277 |
| 4,351,814 A | 9/1982 | Miyata et al. | 423/306 |
| 4,458,026 A | 7/1984 | Reichle | 502/80 |
| 4,656,156 A | 4/1987 | Misra | 502/415 |
| 4,904,457 A | 2/1990 | Misra | 423/115 |
| 4,946,581 A | 8/1990 | van Broekhoven | 209/120 |
| 4,952,382 A | 8/1990 | van Broekhoven | 423/244 |
| 5,079,203 A | 1/1992 | Pinnavaia et al. | 502/84 |
| 5,114,898 A | 5/1992 | Pinnavaia et al. | 502/406 |
| 5,399,537 A | 3/1995 | Bhattacharyya et al. | 502/84 |
| 5,439,861 A | 8/1995 | Bhattachayya et al. | 502/84 |
| 5,507,980 A | 4/1996 | Kelkar et al. | 264/15 |
| 5,518,704 A | 5/1996 | Kelkar et al. | 423/420.2 |
| 5,578,286 A | 11/1996 | Martin et al. | 423/593 |
| 5,591,418 A | 1/1997 | Bhattacharyya et al. | 423/239 |
| 5,728,364 A | 3/1998 | Martin et al. | 423/593 |
| 5,814,291 A | 9/1998 | Kelkar | 423/395 |
| 6,171,991 B1 | 1/2001 | Stamires et al. | 501/141 |

FOREIGN PATENT DOCUMENTS

| | | | |
|---|---|---|---|
| EP | 0 536 879 | 4/1993 | C01G/1/00 |
| WO | WO/91/10505 | 7/1991 | B01J/8/00 |
| WO | WO/91/18670 | 12/1991 | B01J/20/02 |
| WO | WO 01/12542 | 2/2001 | C01B/13/36 |

OTHER PUBLICATIONS

*Materials Chemistry and Physics, Textural Properties of Hydrotalcite–Like Compounds*. . . 14, pp. 569–579 (1986).
*Clays and Clay Minerals, Syntheses of Disordred and Al–Rich Hydrotalcite–Like Compounds*34, pp. 507–510, vol. 34, No. 5, (1986).
*Clays and Clay Minerals,Physico–Chemical Properties of Synthetic Hydrotalcites in Relation to Composition*, vol. 28, No. 1, pp. 50–56, (1980).
*Clays and Clay Minerals, The Syntheses of Hydrotalite–Like Compounds and Their Structures and Physico–Chemical.* . ., vol. 23, pp. 369–375, (1975).
*J. Am. Ceram. Soc., Studies on $4CaO–Al_2O_3$—$13H_2O$ and the Related Natural Mineral Hydrocalumite* 42, No. 3, pp. 121–126, (1959).
*Chemistry Letters, Synthesis of New Hydrotalcit–Like Compounding and Their Physico–Chemical Properties*, pp. 843–848, (1973).
*Anionic Clays: trends in pillary chemistry, its synthesis and microporous solids* (1992), 2, pp. 108–165.
*Catalysis Today, Hydrotalcity–Type Anionic Clays: Preparation, Properties and Applications* 11, pp. 173–301, (1991).
*Clays and Clay Minerals, Polytype Diversity of The Hydrotalicte–Like Minerals II. Determination of the Polytpes of Experimentally Studied Varieties*, vol. 41, No. 5, 558–564, 1993.
*Clays and Clay Minerals, Polytype Diversity of the Hydrotalicity–Like Minerals I. Possible Polytypes and their Diffration Features*, vol. 14, No. 5, 551–557, 1993.
*Hel. Chim. Acta*, 25 pp. 106–137 and 555–569 (1942).
C.P. Kelkar, et al., *Ni–, Mg– and Co–containing hydrotalcite–like materials with a sheet–like morphology: synthesis and characterization, Microporous Materials*, 10 (1997) pp. 163–172.

Primary Examiner—Mark Kopec
(74) Attorney, Agent, or Firm—Louis A. Morris

(57) ABSTRACT

This patent describes economical and environment-friendly processes for the synthesis of Mg-containing non-Al anionic clays. It involves a one-step process wherein a suspension comprising a trivalent metal source and at least a magnesium containing source as a divalent metal source is reacted to obtain a magnesium-containing non-Al anionic clay. The anionic clay has interlayers containing anions comprising hydroxycarbonate, carbonate, bicarbonate, acetate, hydroxyacetate, oxalate, nitrate, hydroxyl, and/or formate or mixtures thereof. There is no necessity to wash or filter the product. It can be spray dried directly to form microspheres or can be extruded to form shaped bodies. The product can be combined with other ingredients in the manufacture of catalysts, absorbents, pharmaceuticals, cosmetics, detergents, and other commodity products that contain anionic clays.

24 Claims, No Drawings

PROCESS FOR PRODUCING MG-CONTAINING NON-AL ANIONIC CLAY

CROSS REFERENCE TO RELATED APPLICATIONS

This application is a continuation-in-part of U.S. patent application Ser. No. 09/637,243, filed Aug. 11, 2000 now U.S. Pat. No. 6,444,188, that claims priority from U.S. Provisional Application Ser. No. 60/148,245, filed Aug. 11, 1999, incorporated herein by reference in its entirety.

BACKGROUND OF THE INVENTION

1. Field of the Invention

This invention involves the preparation of Mg-containing non-Al anionic clays.

2. Description of the Prior Art

Anionic clays have a crystal structure which consists of positively charged layers built up of specific combinations of metal hydroxides between which there are anions and water molecules. Hydrotalcite is an example of a naturally occurring anionic clay, in which carbonate is the predominant anion present. Meixnerite is an anionic clay wherein $OH^-$ is the predominant anion present.

In hydrotalcite-like anionic clays the brucite-like main layers are built up of octahedra alternating with interlayers in which water molecules and anions, more particularly carbonate ions, are distributed. The interlayers contain anions such as $NO_3^-$, $OH^-$, $Cl^-$, $Br^-$, $I^-$, $SO_4^{2-}$, $SiO_3^{2-}$, $CrO_4^{2-}$, $BO_3^{2-}$, $MnO_4^-$, $HGaO_3^{2-}$, $HVO_4^{2-}$, $ClO_4^-$, $BO_3^{2-}$, pillaring anions such as $V_{10}O_{28}^{-6}$ and $MO_7O_{24}^{6-}$, mono-carboxalates such as acetate, dicarboxalates such as oxalate, alkyl sulfonates such as laurylsulfonate.

It should be noted that a variety of terms is used to describe the material which is referred to in this patent as an anionic clay. Hydrotalcite-like and layered double hydroxide are interchangeably used by those skilled in the art. In this patent application we refer to the materials as anionic clays, comprising within that term hydrotalcite-like and layered double hydroxide materials.

The most commonly described anionic clays are Mg—Al anionic clays. In the prior art the emphasis is usually on this type of anionic clays, whereas the Mg-containing non-Al anionic clays are only mentioned in passing, even though the chemistry of their preparation and their properties can be very different and unpredictable. Mg—Al anionic clays are suitable for many applications in the absorbent and catalysts field, but Mg-containing non-Al anionic clays have specific applications in these fields.

The preparation of anionic clays has been described in many prior art publications. Two major reviews of anionic clay chemistry were published in which the synthesis methods available for anionic clay synthesis have been summarized, F. Cavani et al "Hydrotalcite-type anionic clays: Preparation, Properties and Applications," *Catalysis Today*, 11 (1991) Elsevier Science Publishers B. V. Amsterdam. J P Besse and others "*Anionic clays: trends in pillaring chemistry, its synthesis and microporous solids*" (1992), 2, 108, editors: M. I. Occelli, H. E. Robson, Van Nostrand Reinhold, N.Y.

In these reviews basically two types of anionic clay preparation are described. The most conventional method is co-precipitation (in Besse this method is called the salt-base method) of a soluble divalent metal salt and a soluble trivalent metal salt, optionally followed by hydrothermal treatment or aging to increase the crystallite size. The second method is the salt-oxide method in which a divalent metal oxide is reacted at atmospheric pressure with a soluble trivalent metal salt, followed by aging under atmospheric pressure. This method has only been described for the use of ZnO and CuO in combination with soluble trivalent metal salts.

For work on anionic clays, reference is given to the following articles:

*Helv. Chim. Acta*, 25, 106–137 and 555–569 (1942)
*J. Am. Ceram. Soc.*, 42, no. 3, 121 (1959)
*Chemistry Letters (Japan)*, 843 (1973)
*Clays and Clay Minerals*, 23, 369 (1975)
*Clays and Clay Minerals*, 28, 50 (1980)
*Clays and Clay Minerals*, 34, 507 (1996)
*Materials Chemistry and Physics*, 14, 569 (1986).

In addition there is an extensive amount of patent literature on the use of anionic clays and processes for their preparation.

European Patent Application 0 536 879 describes a method for introducing pH-dependent anions into the clay. The clay is prepared by the addition of a solution of $Al(NO_3)_3$ and $Mg(NO_3)_2$ to a basic solution containing borate anions. The product is then filtered, washed repeatedly with water, and dried overnight. Additionally mixtures of Zn/Mg are used.

In U.S. Pat. No. 3,796,792 by Miyata et al. entitled "Composite Metal Hydroxides" a range of materials is prepared into which an extensive range of cations is incorporated, including Sc, La, Th, In, etc. In the examples given solutions of the divalent and trivalent cations are prepared and mixed with base to cause co-precipitation. The resulting products are filtered, washed with water, and dried at 80° C. Example 1 refers to Mg and Sb and Example 3 to Mg and Bi. Other examples are given, and in each case soluble salts are used to make solutions prior to precipitation of the anionic clay at high pH.

In U.S. Pat. No. 3,879,523 by Miyata entitled "Composite Metal Hydroxides" also a large number of preparation examples is outlined. The underlying chemistry, however, is again based on the co-precipitation of soluble salts followed by washing and drying. It is important to emphasize that washing is a necessary part of such preparations, because to create a basic environment for co-precipitation of the metal ions a basic solution is needed and this is provided by $NaOH/Na_2CO_3$ solutions. Residual sodium, for example, can have a significant deleterious effect on the subsequent performance of the product as a catalyst or oxide support.

In U.S. Pat. No. 3,879,525 (Miyata) very similar procedures are again described.

In U.S. Pat. No. 4,351,814 to Miyata et al. a method for making fibrous hydrotalcites is described. Such materials differ in structure from the normal plate-like morphology. The synthesis again involves soluble salts. For example, an aqueous solution of a mixture of $MgCl_2$ and $CaCl_2$ is prepared and suitably aged. From this a needle-like product $Mg_2(OH)_3Cl.4H_2O$ precipitates. A separate solution of sodium aluminate is then reacted in an autoclave with the solid $Mg_2(OH)_3Cl.4H_2O$ and the product is again filtered, washed with water, and dried.

In U.S. Pat. No. 4,458,026 to Reichle, in which heat-treated anionic clays are described as catalysts for aldol condensation reactions, again use is made of magnesium and aluminum nitrate salt solutions. Such solutions being added to a second solution of NaOH and $Na_2CO_3$. After precipitation the slurry is filtered and washed twice with distilled water before drying at 125° C.

In U.S. Pat. No. 4,656,156 to Misra the preparation of a novel absorbent based on mixing activated alumina and hydrotalcite is described. The hydrotalcite is made by reacting activated MgO (prepared by activating a magnesium compound such as magnesium carbonate or magnesium hydroxide) with aqueous solutions containing aluminate, carbonate and hydroxyl ions. As an example the solution is made from NaOH, $Na_2CO_3$ and $Al_2O_3$. In particular, the synthesis involves the use of industrial Bayer liquor as the source of Al. The resulting products are washed and filtered before drying at 105° C.

In U.S. Pat. No. 4,904,457 to Misra a method is described for producing hydrotalcites in high yield by reacting activated magnesia with an aqueous solution containing aluminate, carbonate, and hydroxyl ions.

The methodology is repeated in U.S. Pat. No. 4,656,156.

In U.S. Pat. No. 5,507,980 to Kelkar et at al. a process is described for making novel catalysts, catalyst supports, and absorbers comprising synthetic hydrotalcite-like binders. The synthesis of the typical sheet hydrotalcite involves reacting pseudo-boehmite to which acetic acid has been added to peptize the pseudo-boehmite. This is then mixed with magnesia. More importantly, the patent summary states clearly that the invention uses mono carboxylic organic acids such as formic, propionic and isobutyric acid. In this patent the conventional approaches to preparing hydrotalcites are presented.

In U.S. Pat. No. 6,539,861 a process is disclosed for preparing a catalysts for synthesis gas production based on hydrotalcites. The method of preparation is again based, on the co-precipitation of soluble salts by mixing with base, for example, by the addition of a solution of $RhCl_3$, $Mg(NO_3)_2$ and $Al(NO_3)_3$ to a solution of $Na_2CO_3$ and NaOH.

Also in U.S. Pat. No. 5,399,537 to Bhattacharyya in the preparation of nickel-containing catalysts based on hydrotalcite use is made of the co-precipitation of soluble magnesium and aluminum salts.

In U.S. Pat. No. 5,591,418 to Bhattacharyya a catalyst for removing sulfur oxides or nitrogen oxides from a gaseous mixture is made by calcining an anionic clay, said anionic clay having been prepared by co-precipitation of a solution of $Mg(NO_3)_2$, $Al(NO_3)_3$ and $Ce(NO_3)_3$. The product again is filtered and repeatedly washed with de-ionized water.

In U.S. Pat. No. 5,114,898/WO 9110505 Pinnavaia et al. describe layered double hydroxide sorbents for the removal of sulfur oxide(s) from flue gases, which layered double hydroxide is prepared by reacting a solution of Al and Mg nitrates or chlorides with a solution of NAOH and $Na_2CO_3$. In U.S. Pat. No. 5,079,203 /WO 9118670 layered double hydroxides intercalated with polyoxo anions are described, with the parent clay being made by co-precipitation techniques.

In U.S. Pat. No. 5,578,286 in the name of Alcoa a process for the preparation of meixnerite is described. Said meixnerite may be contacted with a dicarboxalate or polycarboxalate anion to form a hydrotalcite-like material.

In U.S. Pat. Nos. 4,946,581 and 4,952,382 to van Broekhoven co-precipitation of soluble salts such as $Mg(NO_3)_2$ and $Al(NO_3)_3$ with, and without the incorporation of rare earth salts was used for the preparation of anionic clays as catalyst components and additives. A variety of anions and di- and tri-valent cations are described.

As indicated in the description of the prior art given above, there are many applications of anionic clays. These include but are not restricted to: catalysts, adsorbents, drilling muds, catalyst supports and carriers, extenders and applications in the medical field. In particular van Broekhoven has described their use in $SO_x$ abatement chemistry.

Martin et al (U.S. Pat. No. 5,728,364) involves the formation of a hydrotalcite clay by means of a complex multi-step process with at least two steps involving (a) a reaction to give an intermediate layered hydroxide and (b) the addition of an anion source and further reaction. The teachings of this patent emphasize that an intermediate material i.e. an "meixnerite-like intermediate" (column 7 line 14), must be obtained prior to the second step where the layered double hydroxide +$H_2O$ is produced and that this intermediate be produced in a reaction free of ions of carboxylic acid and carboxalate.

Stamires et al (U.S. Pat. No. 6,171,991) teaches a process for making an anionic clay-containing composition that includes the use of an aluminum source. The resulting composition comprises an Mg—Al anionic clay and an Mg—Al anionic clay composited with alumina.

Because of this wide variety of large-scale commercial applications for these materials, new processes utilizing alternative inexpensive raw materials are needed to provide a more cost-effective and environmentally compatible processes for making anionic clays. In particular, from the prior art described above one can conclude that the preparation process can be improved in the following ways: the use of cheaper sources of reactants, processes for easier handling of the reactants and with fewer steps, so that there is no need for washing or filtration, eliminating the filtration problems associated with these fine-particled materials (which are very difficult to filter and wash), the avoidance of alkali metals (which can be particularly disadvantageous for certain catalytic applications): Further, in drying or calcining the anionic clay prepared by prior art processes gaseous emissions of nitrogen oxides, halogens, sulfur oxides, etc. are encountered which cause environmental pollution problems.

SUMMARY OF THE INVENTION

In its broadest embodiment, our invention comprises a process for the preparation of a magnesium-containing non-Al anionic clay. The process comprises a one-step process wherein an aqueous suspension comprising a trivalent metal source and at least a magnesium containing source as a divalent metal source is provided and reacted to obtain a magnesium-containing non-Al anionic clay. The divalent or trivalent metal source or both comprises a hydroxycarbonate, carbonate, bicarbonate, acetate, hydroxyacetate, oxalate, nitrate, hydroxyl, oxide and/or formate anions or mixtures thereof. There may be a source of hydroxycarbonate, carbonate, bicarbonate, acetate, hydroxyacetate, oxalate, nitrate, hydroxyl, oxide and/or formate anions or mixtures thereof, other than anions associated with the divalent or trivalent metal. The anionic clay has interlayers containing anions comprising hydroxycarbonate, carbonate, bicarbonate, acetate, hydroxyacetate, oxalate, nitrate and/or formate anions or mixtures thereof (hydroxyl anions tend to be displaced by the other anions).

Other embodiments of our invention encompass details about compositions, manufacturing steps, etc., all of which are hereinafter disclosed in the following discussion of each of the facets of the present invention.

DETAILED DESCRIPTION OF THE INVENTION

Our invention includes processes for producing Mg-containing non-Al anionic clays using relatively inexpensive starting materials in a simple process which involves reacting mixtures with or without stirring in water, optionally under hydrothermal conditions. Such processes can be operated in standard laboratory/industrial equipment. More specifically, there is no need for washing or filtering, and a wide range of ratios of Mg(II)/M(III) in the reaction product is possible.

This invention involves the use of a trivalent metal source other than aluminum and a divalent metal source in aqueous suspensions, which are reacted, optionally under hydrothermal conditions and the reaction mixture results in the direct formation of a Mg-containing non-Al anionic clay. The powder X-ray diffraction pattern (PXRD) suggests that the product is comparable to anionic clays made by other standard methods. The physical and chemical properties of the product are also comparable to those anionic clays made by the other conventional methods. The overall process of this invention is very flexible, enabling a wide variety of anionic clay compositions and anionic clay-like materials involving for example hydroxycarbonate, carbonate, bicarbonate, acetate, hydroxyacetate, oxalate, nitrate, hydroxyl, oxide and/or formate and mixtures thereof to be prepared in an economically and environmental-friendly manner. The process may be carried out in a one-step process either in batch or in continuous mode.

This invention involves the preparation of Mg-containing non-Al anionic clays. In particular it describes a process for the preparation of an anionic clay wherein a suspension comprising a trivalent metal source and a Mg source is provided and reacted thermally or hydrothermally to obtain a Mg-containing non-Al anionic clay having interlayers that contain anions including hydroxycarbonate, carbonate, bicarbonate, acetate, hydroxyacetate, oxalate, nitrate, hydroxyl, oxide and/or formate anions or mixtures thereof.

It was found that Mg-containing non-Al anionic clays are directly obtained from the reaction according to the invention. This is in contrast to the co-precipitation method wherein soluble salts are first precipitated, filtered, washed to remove unwanted ions and then aged either hydrothermally or not. With the process according to the invention the presence of undesireable ions in the product can be avoided, as will be explained below. If for the trivalent metal source a compound is chosen with harmless ions such as hydroxycarbonate, carbonate, bicarbonate, acetate, hydroxyacetate, oxalate, nitrate, hydroxyl, oxide and/or formate, or mixtures thereof, washing and filtration of the reaction product can be avoided altogether. In fact, it was found that the reaction also takes place when using hydroxycarbonate, carbonate, bicarbonate, acetate, hydroxyacetate, oxalate, nitrate, hydroxyl, oxide and/or formate anions, or mixtures thereof for both the divalent metal source and the trivalent metal source, in which case also no washing and filtration has to take place.

Alternatively, the divalent and/or trivalent metal sources may be oxides, hydroxides and mixtures thereof, in conjunction with the hydroxycarbonate, carbonate, bicarbonate, acetate, hydroxyacetate, oxalate, nitrate, and/or formate anions or mixtures thereof, the latter of which will serve to preferentially displace hydroxy anions.

The process of the present invention aims at a single step process and in fact requires that hydroxycarbonate, carbonate, bicarbonate, acetate, hydroxyacetate, oxalate, nitrate, hydroxyl, oxide and/or formate anions or mixtures thereof be provided to the process. Thus, completely opposite Martin et al, as described above, the process of the present invention does not require a meixnerite type intermediate phase containing hydroxide anions, but requires the presence of hydroxycarbonate, carbonate, bicarbonate, acetate, hydroxyacetate, oxalate, nitrate, hydroxyl, oxide and/or formate anions, or mixtures thereof in its single step. The instant process is thus significantly simpler and more cost effective than the two step process described in Martin et al.

Martin et al also teaches an additional reaction of the intermediate of its process with an acid to first form an intermediate and then exchange the intermediate with an acid. It is not necessary in the process of the present invention to add an acid, i.e. if an acid (or base) is added it is as part of the one-step process and acid (or base) is added to control pH and not for the purpose of providing anions.

The above discussed Stamires et al, is diametrically opposite the present invention, in that it requires aluminum in the clay composition.

Since the process disclosed in this patent does not require washing of the product or filtering, there is no filtrate waste or gaseous emissions (e.g. from acid decomposition), making the process particularly environmental-friendly and more suited to the environmental constraints which are increasingly imposed on commercial operations. The product can be spray dried directly to form microspheres or can be extruded, pelletized or beaded to form shaped bodies.

Anionic clays prepared by this method exhibit the well known properties and characteristics (e.g. chemical analysis, powder X-ray diffraction pattern, FTIR, thermal decomposition characteristics, surface area, pore volume, and pore size distribution) usually associated with anionic clays prepared by the customary and previously disclosed methods.

The anionic clay according to the invention has a layered structure corresponding to the general formula

$[Mg(II)_m^{2+}M(III)_n^{3+}(OH)_{2m+2n}] \cdot X_{n/z}^{z-} \cdot bH_2O$

Wherein m and n have a value such that m/n=1 to 10, preferably 1 to 6, and b has a value in the range of from 0 to 10, generally a value of 2 to 6 and often a value of about 4. X comprises hydroxycarbonate, carbonate, bicarbonate, acetate, hydroxyacetate, oxalate, nitrate, hydroxyl, oxide and/or formate or mixtures thereof. It is more preferred that m/n should have a value of 2 to 4, more particularly a value close to 3.

The Trivalent Metal Source

Suitable trivalent metal sources are compounds containing $Mn^{3+}$, $Fe^{3+}$, $Co^{3+}$, $Ni^{3+}$, $Cr^{3+}$, $Ga^{3+}$, $B^{3+}$, trivalent rare earth metal cations such as $La^{3+}$ and $Ce^{3+}$, $Ga^{3+}$, or mixtures of said compounds. Preferably oxides, hydroxides, carbonates, or hydroxycarbonates, or mixtures thereof, of these metals are used, but also bicarbonates, acetates, hydroxyacetates, oxalates, nitrates, hydroxylates, oxides and/or formates, or mixtures thereof can be used.

Divalent Metal Source

Suitable Mg sources are MgO, Mg(OH)$_2$, and magnesium salts such as magnesium hydroxycarbonate, magnesium acetate, magnesium hydroxyacetate, magnesium carbonate, and magnesium bicarbonate. In addition to the Mg source other divalent metal source may be added such as compounds containing $Mg^{2+}$, $Ca^{2+}$, $Zn^{2+}$, $Mn^{2+}$, $Co^{2+}$, $Ni^{2+}$, $Fe^{2+}$, $Sr^{2+}$, $Ba^{2+}$, $Cu^{2+}$, $Sn^{2+}$, $Cr^{2+}$, $Cd^{2+}$, $V^{2+}$, and mixtures of said compounds. Preferably oxides, hydroxides, hydroxycarbonates, carbonates and bicarbonates of these metals are used, but also nitrates chlorides, sulfates, phosphates, acetates, hydroxyacetates, formates, oxalates, borates, tungstates, molybdates, vanadates or mixtures thereof can be used.

The divalent and trivalent metal sources may be associated with any of the anions as described above, so long as the interlayers contain anions that include a hydroxycarbonate, carbonate, bicarbonate, acetate, hydroxyacetate, oxalate, nitrate, oxide and/or formate or mixtures thereof.

Conditions

As mentioned above, the reaction is conducted under thermal or hydrothermal conditions. Within the context of this description hydrothermal means in the presence of water at at a temperature above 100° C. at increased pressure. Thermal means at a temperature between ambient and 100° C. in air or other atmosphere. Preferably the reaction takes place in water in an autoclave at a temperature above 100° C., i.e. under autogeneous pressure.

Alternative to providing carbonate anions as discussed above, the reaction can be conducted in the presence of $CO_2$. The $CO_2$ may be derived from the $CO_2$ normally present in air or it may be added to the reaction separately by carbonate present in the water in the reaction mixture or by adding reactants comprising compounds bearing carbonate or bicarbonate anions, for instance, by using a carbonate divalent or trivalent metal source. Hydroxycarbonate, acetate, hydroxyacetate, oxalate, nitrate, hydroxyl, oxide and/or formate anions may also be added to the reaction separately by being present in the reaction mixture, or be provided by one or more of the reactants.

Said aqueous suspension may be obtained by either combining slurries of the starting materials or adding divalent metal source to a slurry of trivalent metal source or vice versa. There is no need to wash or filter the product, as unwanted ions (e.g. sodium, chloride, sulfate)which are frequently encountered when using other preparation methods, are absent in the product. If desired a preformed anionic clay may be added as a seed to the reaction mixture. Said preformed clay may be recycled anionic clay from the reaction mixture or anionic clay made separately by the process according to the invention or any other process.

Because of its simplicity, this process can be carried out in a continuous mode by mixing of a first slurry comprising a trivalent metal source and a second slurry comprising magnesium source passing the mixed slurry through a reactor vessel which can operate under hydrothermal conditions. Said first and/or second slurry may be subjected to a treatment prior to mixing the slurries. Said pre-treatment may involve treatment with acid, base treatment, thermal and/or hydrothermal treatment, all optionally in the presence of seeds or combinations thereof.

The non-soluble ingredients of the aqueous suspension comprising the reaction mixture may be milled or homogenized in an aqueous medium, either before being added to the reaction mixture, or while part of the reaction mixture. In this specification the tern 'milling' is defined as any method that results in reduction of the particle size. Such a particle size reduction can at the same time result in the formation of reactive surfaces and/or heating of the particles. Instruments that can be used for milling include ball mills, high-shear mixers, colloid mixers, and electrical transducers that can introduce ultrasound waves into a slurry. Low-shear mixing, i.e. stirring that is performed essentially to keep the ingredients in suspension, is not regarded as 'milling'.

Homogenization may be carried out by mechanical means such as high shear mixing or by the use of ultra-sound.

As mentioned-above, if desired inorganic or organic acids and bases, for example for control of the pH, may be added to the slurry before or during reaction or to the individual reactants before combining them in the slurry. The acid and bases of choice are formic acid, acetic acid, nitric acid, oxalic acid, ammonium hydrogen phosphate, ammonium phosphate, phosphoric acid, ammonium hydroxide, ammonium carbonate and ammonium bicarbonate, because these types of acids and bases do not introduce unwanted ions in the reaction mixture.

The most preferred combinations of a divalent metal source and a trivalent metal source are Ga—Mg, Fe—Mg, Cr—Mg, La—Mg, Ce—Mg, Fe—Zn/Mg, La—Zn/Mg, Ce—Zn/Mg, Ga—Zn/Mg, Ga—Fe/Mg, Cr—Zn/Mg, Cr—Cu/Mg, Cr—Mn/Mg and Fe—Co/Mg because these combinations result in Mg-containing non-Al anionic clays with specific applications in the catalyst field.

If desired, the anionic clay prepared by the process according to the invention may be subjected to ion exchange or pillaring. Upon ion exchange the interlayer charge-balancing anions are replaced with other anions. Said other anions are the ones commonly present in anionic clays and include pillaring anions such as $V_{10}O_{28}^{-6}$, $Mo_7O_{24}^{6-}$ and other anions known in the art for use in ionic clays. Said ion exchange can be conducted before drying or after the anionic clay formed in the slurry.

The anionic clay prepared by the process according to the invention may be aged for a period of from about 5 minutes to about 5 days.

The products of this invention may be calcined to form solid solutions which may contain spinels. The calcining may be carried out at a temperature from about 300° C. to about 1,000° C. to form a solid solution.

The solid solution may be hydrated by treatment, in an aqueous slurry that may contain additives comprising soluble compounds, thermally at temperatures not more than about 100° C., or hydrothermally at a temperature over about 100° C. at autogeneous pressure.

The calcined materials may be rehydrated by treatment in aqueous slurries that may contain additives comprising soluble compounds. The products may be shaped before or after aging by conventional means, such as spray drying or extrusion.

The process of the invention provides wide flexibility in preparing products with a wide range of M(II):M(III) ratios. The M(II):M(III) ratio can vary from 0.1 to 10 preferably from 1 to 6, more preferred from 2 to 4, and especially preferred to close to 3.

For some applications it is desirable to have additive compounds containing one or more of metals and non-metals, such as rare earth metals, noble metals, Si, P, B, Ti, Zr, group VI, group VIII, alkaline earth (for instance Ca and Ba) and/or transition metals (for example Mn, Fe, Ti, Zr, Cu, Ni, Zn, Mo, Sn, V, Co and W), present. Said metals can easily be deposited on the anionic clay. They can also be added either to the divalent metal source or the trivalent metal source or to the slurry during preparation of the anionic clay.

The present invention is illustrated by the following examples that are not to be considered limiting by any means. It is understood that anions associated with the reactants will appear in the interlayers.

EXAMPLES

Example 1

A slurry was provided of gallium nitrate and MgO with a Mg/Ga ratio of 2.3. The pH of the slurry was adjusted to 10.02 with NH$_3$OH. The slurry was subjected to hydrothermal treatment in an autoclave at 120° C. for 1 hour. The product was dried at 110° C. X-ray diffraction confirmed the formation of a Mg—Ga anionic clay.

Example 2

A slurry was provided of gallium oxide and MgO with a Mg/Ga ratio of 2.3. The pH of the slurry was adjusted to 10.2 with NH$_3$OH. The slurry was subjected to thermal treatment at 90° C. for 18 hours. The product was dried at 110° C. X-ray diffraction confirmed the formation of a Mg—Ga anionic clay.

Example 3

A slurry was provided of gallium oxide and MgO with a Mg/Ga ratio of 2.3. The pH of the slurry was adjusted to 10.2 with NH$_3$OH. The slurry was subjected to thermal treatment at 120° C. for 18 hours. The product was dried at 110° C. X-ray diffraction confirmed the formation of a Mg—Ga anionic clay.

Example 4

A slurry was provided of gallium oxide and MgO with a Mg/Ga ratio of 2.3. The pH of the slurry was adjusted to 10.2 with NH$_3$OH. The slurry was subjected to hydrothermal treatment at 198° C. for 1 hour. The product was dried at 110° C. X-ray diffraction confirmed the formation of a Mg—Ga anionic clay.

Example 5

Example 1 was repeated except that ½ of the molar weight of the MgO was replaced with an equivalent molar weight of zinc nitrate. The rest of the composition and process was the same. The product was an anionic clay containing Ga, Mg and Zn.

Example 6

Example 1 was repeated except that the magnesium oxide was replaced with magnesium hydroxide. The rest of the composition and process was the same. The product, according to XRD analysis, was an anionic clay containing Ga and Mg.

Example 7

Example 4 was repeated except that the MgO was replaced with magnesium hydroxyacetate. The rest of the composition and process was the same. XRD analysis indicated the product was an anionic clay containing Ga and Mg.

Example 8

Example 3 was repeated except that the magnesium oxide was replaced with magnesium hydroxycarbonate. The rest of the composition and process was the same. XRD analysis indicated product was an anionic clay containing Ga and Mg.

Example 9

Example 3 was repeated except that the magnesium oxide was replaced with magnesium carbonate. The rest of the composition and process was the same. XRD analysis indicated the product was a Ga—Mg anionic clay.

Example 10

Magnesium oxide was slurried in a solution containing chromium nitrate with high shear mixing using proportions such that the Mg to Cr molar ratio was about 2.3. Mixture was aged at 85° C. for 18 hours. Product was filtered, washed and dried at 120° C. overnight. XRD analysis indicated the product was a Cr—Mg anionic clay.

Example 11

In a nitrogen atmosphere, ferric nitrate solution was mixed with magnesium oxide at a molar ratio of Mg to Fe of about 2.3 and slurry homogenized with high shear mixing and aged at 120° C. for 8 hours, filtered and dried. XRD analysis indicated product was an Fe—Mg anionic clay.

Example 12

A solution of gallium nitrate and a solution of ferric nitrate was mixed at equal molar ratio. Subsequently, magnesium oxide was added while mixed under high shear sufficient to obtain a Mg to [Ga+Fe] molar ratio of about 2.5. Slurry was aged at 165° C. for four hours. Product was filtered and dried at 120° C. for 8 hours.

What is claimed is:

1. A process for the preparation of a magnesium-containing non-Al anionic clay comprising a one-step process wherein a reaction mixture comprising an aqueous suspension comprising a trivalent metal source and at least a magnesium containing source as a divalent metal source is provided and reacted to obtain a magnesium-containing non-Al anionic clay, said divalent or trivalent metal source or both selected from the group consisting of a hydroxycarbonate, carbonate, bicarbonate, acetate, hydroxyacetate, oxalate, nitrate, hydroxide, oxide, formate anions or mixtures thereof, and/or there being a source of anions selected from the group consisting of hydroxycarbonate, carbonate, bicarbonate, acetate, hydroxyacetate, oxalate, nitrate, hydroxyl, formate anions or mixtures thereof, other than anions associated with said divalent or trivalent metal, said anionic clay having interlayers containing anions selected from the group consisting of hydroxycarbonate, carbonate, bicarbonate, acetate, hydroxyacetate, oxalate, nitrate, formate anions or mixtures thereof.

2. The process of claim 1 wherein the trivalent metal source is a compound selected from the group consisting of compounds containing Mn$^{3+}$, Co$^{3+}$, Ni$^{3+}$, Cr$^{3+}$, Fe$^{3+}$, Ga$^{3+}$, Sc$^{3+}$, B$^{3+}$, trivalent rare earth cations, or a mixture of said compounds.

3. The process of claim 2 wherein said trivalent rare earth cations are one or both of La$^{3+}$ and Ce$^{3+}$.

4. The process of claim 1 wherein said magnesium source is selected from the group consisting of MgO, Mg(OH)$_2$, and magnesium salts selected from the group consisting of magnesium hydroxycarbonate, magnesium acetate, magnesium hydroxyacetate, magnesium carbonate, magnesium bicarbonate, or mixtures thereof.

5. The process of claim 1 wherein in addition to the magnesium source an additional divalent metal source is added which is a compound containing Ca$^{2+}$, Zn$^{2+}$, Mn$^{2+}$, Co$^{2+}$, Ni$^{2+}$, Fe$^{2+}$, Sr$^{2+}$, Ba$^{2+}$, Cu$^{2+}$, Sn$^{2+}$, Cr$^{2+}$, Cd$^{2+}$, V$^{2+}$, or mixtures thereof.

6. The process of claim 1 wherein the anions of said divalent metal source are selected from the group consisting of oxides, hydroxides, hydroxycarbonates, carbonates, bicarbonates, nitrates chlorides, sulfates, phosphates, acetates, hydroxyacetate, formates, oxalates, borates or mixtures thereof.

7. The process of claim 1 wherein both the divalent metal source and the trivalent metal source comprise a hydroxycarbonate, carbonate, bicarbonate, acetate, hydroxyacetate, oxalate, nitrate, hydroxide, oxide and/or formate or mixtures thereof.

8. The process of claim 1 wherein combinations of said divalent metal source and said trivalent metal source are selected from the group consisting of Ga—Mg, Fe—Mg, Cr—Mg, La—Mg, Ce—Mg, Fe—Zn/Mg, La—Zn/Mg, Ce—Zn/Mg, Ga—Zn/Mg, Ga—Fe/Mg, Cr—Zn/Mg, Cr—Cu/Mg, Cr—Mn/Mg and Fe—Co/Mg.

9. The process of claim 1 wherein acid or base is present in the suspension.

10. The process of claim 9 wherein said acid or base is selected from the group consisting of formic acid, acetic acid, nitric acid, oxalic acid, ammonium hydrogen phosphate, ammonium phosphate, phosphoric acid, ammonium hydroxide, ammonium carbonate and ammonium bicarbonate, or mixtures thereof.

11. The process of claim 1 wherein the process is carried out in a continuous mode.

12. The process of claim 1 wherein the reaction is conducted under thermal conditions at a temperature between ambient and 100° C. in air or in inert atmosphere, or under hydrothermal conditions in the presence of water at a temperature above about 100° C. at autogeneous pressure.

13. The process of claim 1 wherein additives comprising one or more metals and non-metals are added to said clay selected from the group consisting of rare earth metals, noble metals, Si, P, B, Ti, Zr, group VI, group VIII, alkaline earth and transition metals.

14. The process of claim 13 wherein said alkaline earth metals are Ca, or Ba, or both.

15. The process of claim 13 wherein said transition metals are selected from the group consisting of Mn, Fe, Ti, Zr, Cu, Ni, Zn, Mo, Sn, V, Co and W.

16. The process of claim 1 wherein the Mg-containing non-Al anionic clay is subjected to an ion-exchange treatment.

17. The process of claim 16 wherein the Mg-containing non-Al anionic clay is ion exchanged with pillaring anions selected from the group consisting of $V_{10}O_{28}^{6-}$ and $Mo_7O_{24}^{6-}$., tungstate, phosphate, borate, vanadate and other anions suitable for use in ionic clays.

18. The process of claim 1 wherein additives are deposited on the Mg-containing non-Al anionic clay.

19. The process of claim 1 wherein non-soluble ingredients of said aqueous suspension are milled or homogenized in an aqueous medium, either before being added to said aqueous suspension, or while part of said aqueous suspension.

20. The process of claim 1 wherein the magnesium-containing non-Al anionic clay product is calcined at a temperature from about 300° C. to about 1,000° C. to form solid solutions which may contain spinels.

21. The process of claim 20 wherein said solid solution is hydrated by treatment in an aqueous slurry, that may contain additives comprising soluble compounds, thermally at temperatures not more than about 100° C., or hydrothermally at a temperature over about 100° C. at autogeneous pressure.

22. The process of claim 1 wherein said ionic clay is aged at reaction conditions for a period of about 5 minutes to about 5 days.

23. The process of claim 22 wherein the reaction mixture is shaped before aging.

24. The process of claim 22 wherein the reaction mixture is shaped after aging.

* * * * *